Aug. 26, 1952  F. C. WILSON  2,608,313
FOUR-WHEELED DOLLY FOR TRANSPORTING TRACTOR UNITS
Filed Dec. 18, 1950  4 Sheets-Sheet 3

Inventor
Frank C. Wilson,
By
Attorney

Aug. 26, 1952          F. C. WILSON          2,608,313

FOUR-WHEELED DOLLY FOR TRANSPORTING TRACTOR UNITS

Filed Dec. 18, 1950          4 Sheets-Sheet 4

Inventor
Frank C. Wilson,
Attorney

Patented Aug. 26, 1952

2,608,313

UNITED STATES PATENT OFFICE 2,608,313

FOUR-WHEELED DOLLY FOR TRANSPORTING TRACTOR UNITS

Frank C. Wilson, Arcade, N. Y., assignor to Manufacturers and Traders Trust Company, Buffalo, N. Y., a corporation of New York, Jack A. Ahern, and David D. Nash, as executors of the estate of Kirke R. Wilson Application December 18, 1950, Serial No. 201,430

10 Claims. (Cl. 214—75)

In tractor design the power plant features, namely, the motor, transmission gearing and differential gearing, are incorporated in separably connected units which are arranged in longitudinal alinement and are connected in tandem relation by bolted flange connections, the units as connected constituting a rigid integer. In the design type which is principally followed the motor, transmission gearing and differential gearing are incorporated in separate units, namely, a motor unit, a transmission unit and a differential unit. In another design type the transmission gearing and the differential gearing are incorporated in a single unit which is separably and rigidly connected to the motor unit. In either case one or more of the units will require repair operations wherein the work must be performed at a bench or equivalent support such as the table of a machine tool or milling machine. When such repair work is required it is necessary to jack up the tractor and separate one or more of the units from the adjacent unit or units and then to remove the unit or units which require repair from the tractor to the bench or table where the work is to be performed.

The units are quite heavy and cumbersome. Heretofore the separation of a unit from an adjoining unit and the removal of the separated unit from the tractor to the bench or table involves arduous labor, the services of a number of workmen, and a very considerable period of time and is attended by the hazards of a unit slipping or tilting and falling or being otherwise accidentally dropped with the resultant injury to the unit and liability of injury to the workmen. The same arduous and time consuming labor and the same hazards are presented in connection with the removal of the repaired unit or units from the table, their conveyance back to the tractor and the restoration of their original assembly in the tractor.

Thus ordinarily for work of this character the continuous services of five or six workmen are required; in addition to jacking up the tractor elaborate shimming operations are required to provide for the stable support of the units as separated; skilled care must be exercised to avoid injury, distortion or otherwise, to various cooperating shafts which must be removed from the units before the repairs are made and restored to the units in perfect alinement after the repairs are completed; and the time required for the separation of the units from the tractor and from one another, for their conveyance to the bench or table and their return to the tractor and reassembly as a rigid integer involves many hours, usually from six to eight hours or even more.

This invention relates to improvements in wheeled dollies intended for principal use for handling the above named tractor units when any one or more of them may require repair operations at a bench or the table of a machine tool or milling machine.

The invention takes advantage of the fact that the units are, in assembly, connected as a rigid integer and has for its objects to eliminate the need for a large crew of workmen, to facilitate the separation, realinement and reconnection of the units as a rigid integer, substantially to eliminate the hazards of the slipping or dropping of a unit, substantially to eliminate the liability of injury or distortion of the originally connected longitudinal shafts incorporated in the units and to insure the restoration of such shafts in perfect alinement when the units are reconnected, and to effect valuable savings of time and labor in the operations described.

Thus the invention enables the work to be done by a single workman; eliminates shimming operations for the support of the units; facilitates the separation of the units and their realinement and reconnection when the repair work has been done; provides for the support of the units in transit in such manner that the liability of their tilting or slipping and falling or being dropped is eliminated; and, with a single workman, instead of a crew of workmen, enables the work to be done in a minor fraction of the time heretofore required, that is to say within two or three hours of time in contrast to the six or eight or more hours heretofore required.

Generally speaking the dolly may be accurately wheeled into position under the tractor, being so constructed as to have ample clearance space; it includes serially arranged independent supporting elements for each unit; the supporting elements at the ends of the series are each provided with jack features; each supporting element provides for three-point supporting engagement with the corresponding unit; the jack carrying supporting elements are each independently positionably adjustable relatively to the adjacent element in a longitudinal direction; each supporting element includes vertically adjustable parts for at least three point supporting engagement with the overlying unit; and each supporting element includes additional parts for the lateral support or stabilization of the unit which it carries. As wheeled under the tractor all of the direct supporting parts may be operated and adjusted by the workman from positions at the front, rear and sides of the tractor.

The embodiment of the invention selected for illustration in the accompanying drawings is applicable to tractors of the particular design type wherein the motor, transmission gearing and differential gearing are incorporated in separate units, three units being thus provided in tandem relation and being connected in use as a rigid integer.

Figures 8, 9:
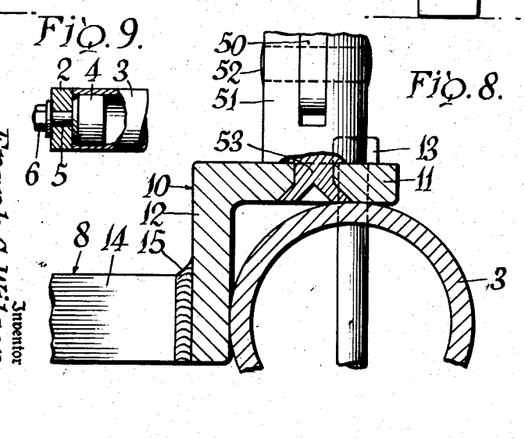
Figure 8 is a detail cross sectional view on the line 8—8 of Figure 1.
Figure 9 is a detail vertical section on the line 9—9 of Figure 5.

The dolly includes a wheel supported main rectangular horizontal supporting frame designated generally as 1. The frame 1 includes transversely extending end bars 2 and longitudinally extending parallel side bars 3. The side bars 3 are preferably of cylindrical cross sectional contour and preferably tubular. The end bars 2 are rigidly connected to the side bars 3 at their ends. The connections may be of any suitable character. As shown in Figure 9, the side bars 3 are provided at their ends with rigidly secured plugs 4, each having an outwardly projecting terminally threaded stud 5. The end bars 2 are formed with openings to take over the studs 5 and adjoin the ends of the bars 3, being held in fixed relation to the bars 3 by nuts 6 fitted upon the threaded terminals of the studs 5.

Figure 1:
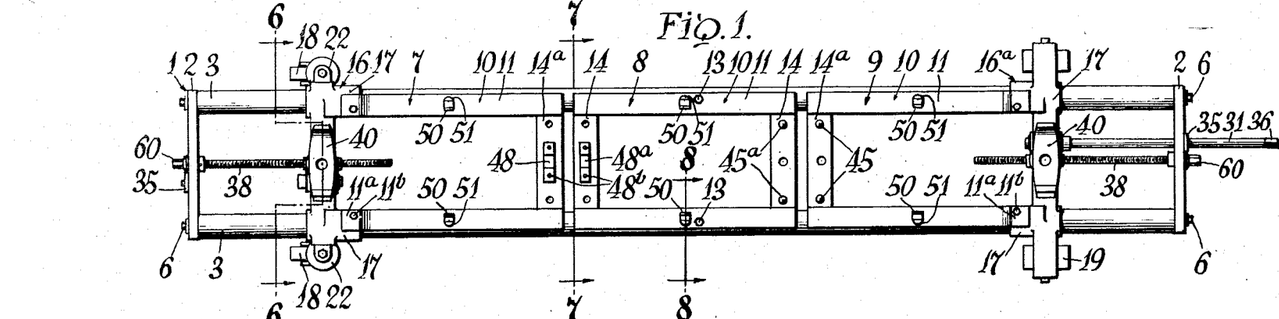
Figure 1 is a plan view of a dolly in accordance with the invention in a form which, as now considered, is preferred.
Figure 2:
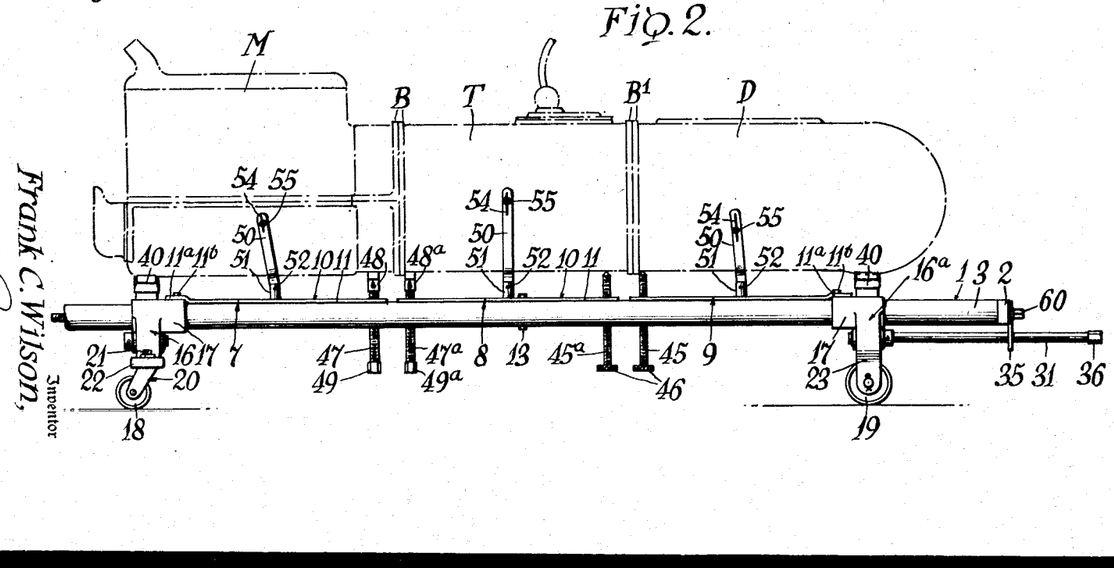
Figure 2 is a side elevation thereof, the motor, transmission and differential units of the tractor being shown in coupled relation in dot and dash lines.
Figures 4, 14, 15:
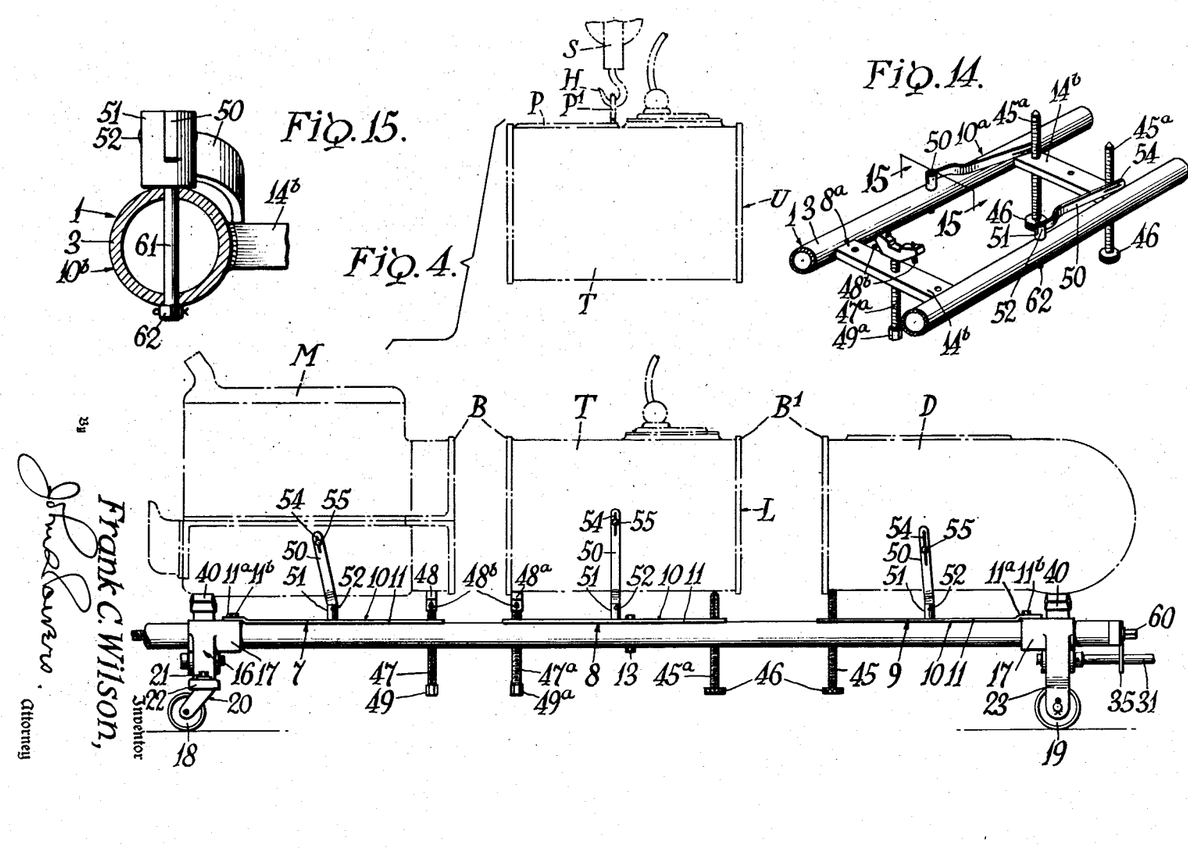
Figure 4 is a side elevation corresponding to Figure 2 but with the motor, transmission and differential units indicated by dot and dash lines in disconnected relation and adjustably spaced from one another, this figure also showing by distinguishing dot and dash lines one of the units, i. e. the middle unit, as lifted from the dolly by a hoist.
Figure 14 is a fragmentary perspective view of a modified construction of the features which constitute the supporting element of the transmission unit.
Figure 15 is a detail cross sectional view on line 15—15 of Figure 14.

Referring to Figures 2 and 4 the motor, transmission and differential units of a tractor of the design type wherein these units are separate are shown in dot and dash lines and are designated as M, T and D respectively. Accordingly the dolly construction described includes supporting elements severally for the units M, T and D, these being arranged in tandem relation and designated generally as 7, 8 and 9 respectively. The end elements 7 and 9 are formed for slidable adjustment upon the frame 1. The middle element 8 is fixed relatively to the frame 1.

The elements 7 and 9 are each in the form of auxiliary rectangular frames. When the middle element 8 is required, as in the specific construction described, it is preferably, for the purpose of manufacturing convenience, in the form of an auxiliary frame generally similar to the frames which constitute the end elements 7 and 9 and is so shown in Figures 1, 2, 3 and 4. However since the middle element 8 is fixed relatively to the frame 1 it may be constituted in other forms, for example in accordance with the modification shown in Figures 14 and 15 and hereinafter described in detail.

Figure 6:
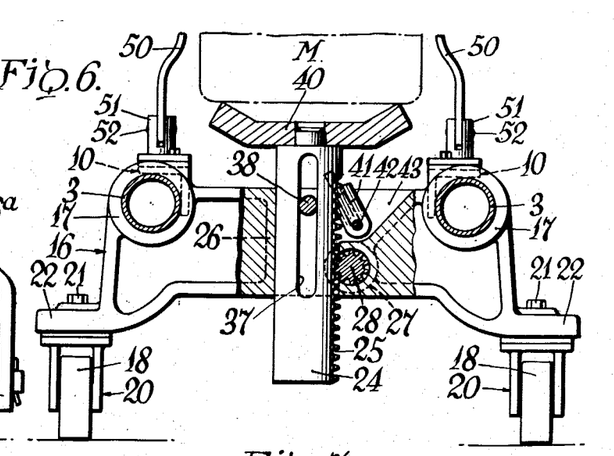
Figure 6 is a view, partly in elevation and partly in cross section on the line 6—6 of Figure 1.
Figure 7:
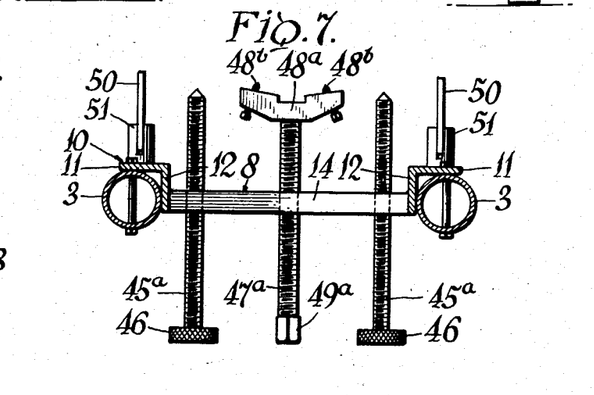
Figure 7 is a view partly in elevation and partly in cross section on the line 7—7 of Figure 1.

As shown in Figures 1 to 4 each of the supporting elements 7, 8 and 9 includes longitudinal side bars 10 which are conveniently of angle iron cross section (Figures 6 and 8) with their horizontal flanges 11 having supporting engagement upon the frame side bars 3 and their depending vertical flanges 12 adjoining the inner sides of the bars 3.

The side bars 10 of the middle element 8 are fixed to the frame side bars 3 by bolt and nut fastenings 13. Thereby the element 8 is held immovable relatively to the frame 1. The element 8 is completed by cross members 14 in the form of bars which extend between the end portions of the vertical flanges 12 of the side bars 10 and are rigidly connected to these flanges in any suitable manner, e. g., as by welds 15 (Figure 8).

Whereas the middle element 8 is fixed relatively to the frame 1, the side bars 10 of the end elements 7 and 9 are slidable upon the bars 3. Each element 7 and 9 includes a cross member 14a at its inner end similar in all respects to the cross members 14. Each of the elements 7 and 9 also includes a cross member at its outer end. The outer cross members of the elements 7 and 9 are in the form of cross heads 16 and 16a respectively. Each cross head is formed with longitudinal sleeves 17 (Figures 1 and 6) which are slidably fitted upon the frame side bars 3 and each carries a jack feature to be later described. The side bars 10 of the elements at the end of the series, i. e., the side bars of the elements 7 and 9 of the construction disclosed, are connected, as by welding, to the cross bars 14a and are also connected to the cross heads 16 and 16a, the horizontal flanges 11 of the side bars having offset terminal extensions 11a which overlie the sleeves 17 and are connected to them by screws 11b.

Figure 5:
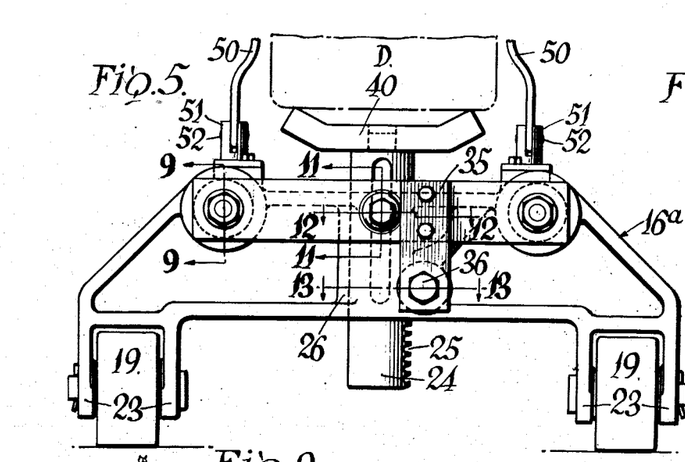
Figure 5 is an end elevation as viewed from the right end, Figure 1 of the drawing being considered.

The dolly supporting wheels 18 and 19 are preferably carried by the elements 7 and 9 and connected to the cross heads 16 and 16a. The wheels 18, carried by the cross head 16, are preferably parts of casters 20, each having a vertical swivel mounting 21 in a terminal ear 22 (Figures 1 and 6) carried by the cross head 16. The wheels 19, carried by the cross head 16a (Figure 5), are preferably mounted on fixed horizontal axes and are each supported by and between a pair of depending lugs 23.

Each jack feature includes a vertical bar 24 having a vertical series of horizontal rack teeth 25. The bars 24 are each mounted for vertical axial movement in either direction and operate within a vertical guide sleeve 26 which is a part of the corresponding cross head and is located centrally thereof. The interior of the sleeve 26 is in communication with a horizontally extending sleeve 27 which provides a bearing for a rotatable gear element 28, the teeth of which engage the rack teeth 25, these projecting into the sleeve 27. The gear element 28 is held against axial displacement from the sleeve 27 by end collars 29 and 30 which bear against the outer end faces of the sleeve 27. The gear element 28 may be rotated in either direction by a longitudinal shaft 31, the free end of which projects into an axial recess 32 in an end of the gear element 28 and is provided with a diametrical recess 33 to accommodate a pin 34 fitted in the walls of the recess 32 and arranged diametrically. The shaft 31 is journalled in and otherwise supported by a hanger 35, one at each end of the frame 1. Each hanger 35 is secured to and projects downwardly from a corresponding frame end bar 2. One shaft 31 may be used for the operation, successively, of the two jack features and by reason of the relation of the recess 33 and the pin 34 may be freely engaged with or disengaged from a gear element 28. Assuming that the jack feature of the cross head 16a is the first one to be operated (Figures 1 and 3), the shaft 31 is inserted through the opening in the corresponding hanger 35 and is connected to the gear element 28 by effecting the engagement of its recess 33 with the pin 34. When the bar 24 of the jack feature of the cross head 16a has been raised to the extent required the shaft 31 is disconnected and removed and is then applied in like manner and for the same purpose of operation to the jack feature of the cross head 16. In its operative relation the shaft 31 projects for a suitable distance outwardly beyond the corresponding hanger 35. At its outer end the shaft 31 is provided with a flat faced, e. g. hexagonal, end portion 36 to which an operating handle or crank (not shown) may be detachably fitted.

Each rack bar 24 is provided with a vertical slot 37 which is located diametrically and accommodates a threaded longitudinal shaft 38 having threaded engagement in diametrically alining openings 39 formed in the sleeve 26. The shaft 38 holds the rack bar against turning movement about its longitudinal axis and by engagement with the ends of the corresponding slot 37 limits the upward and downward movement of the rack bar. Each rack bar is provided at its upper end with a transversely extending pad or saddle 40 for supporting engagement with the under face of the housing of an adjacent unit M or D as the case may be, the pads 40 being suitably fixed to the upper end of the rack bar and thereby held against turning movement. When a rack bar 24 is raised to bring its pad 40 into engagement with the corresponding unit and to lift the corresponding end of the tractor to a sufficient extent above the floor the rack bar is caused to serve as a support for the corresponding end of the tractor by means of a manually operated toothed dog 41 which is mounted on a horizontal rock shaft 42 and which is movable within a recess 43 into engaged or disengaged relation with the rack teeth 25, the side walls of the recess 43 providing bearings for the shaft 42. The shaft 42 is provided at one end with an arm 44 which extends from the shaft in right angular relation and serves as a handle by which the shaft 42 may be rocked and the dog 41 thereby moved into engaged or disengaged relation relatively to the rack teeth 25.

The dolly is wheeled under the tractor as it stands upon the floor into a position wherein the pads 40, alined longitudinally with one another, are also each accurately alined with the longitudinal center of the overlying unit and are positioned at a suitable point with reference to the longitudinal center line of the unit. The jack features are then operated successively by the shaft 31 in order to lift the tractor for a suitable distance above the floor, the integer composed of the connected power plant units being supported, as lifted, in a horizontal position.

Each of the supporting elements 7, 8 and 9 is constructed to provide at least three point support for the overlying unit. In the case of the end supporting element 7 one point of support is provided by the pad 40 and the other two points are provided by a pad 48 which is mounted by means of a swivel connection upon the upper end of a vertical post 47. The post 47 has threaded engagement in a central opening in the cross bar 14a and at its lower end is formed with a flat faced, i. e., hexagonal, portion 49 to which an operating handle (not shown) may be detachably applied. Since the pad 48 has a swiveled mounting it may be readily set manually in a transverse position, regardless of the rotation of the post 47. The pad 48 is shaped to conform to the curved contour of the overlying part and to have supporting engagement with said part at two suitably spaced points. In different tractors of the same design type there may be individual irregularities in the surface which is engaged by the pad 48. In order to compensate for such irregularities the pad 48 is preferably provided at each end with a screw 48b. The screws 48b are arranged in upwardly converging relation and provide the actual points of support. In compensation for surface irregularities either or both of the screws 48b may be adjusted in such direction and to such extent as circumstances may require. In the case of the end supporting element 9 one point of support is provided by the pad 40 and the other two points are provided by vertical stems 45 which are threaded through openings in the cross bar 14a and at their lower ends carry knurled finger grips 46. In the case of the central supporting element 8 two points of support are provided by a pad 48a, generally similar to the pad 48 and having a swiveled connection at the upper end of a vertical post 47a, similar to the post 47, and which has threaded engagement in a central opening formed in the cross bar 14 which is adjacent the cross bar 14a of the element 7, the post 47a having at its lower end a hexagonal portion 49a to which an operating handle may be detachably applied. The pad 48a is preferably, and for a similar purpose, provided with the screws 48b above described. Two other points of support are provided by two stems 45a having threaded engagement in the other cross bar 14 and similar in all respects to the stems 45. Generally speaking the pads 48 and 48a are used where the adjacent surfaces of the overlying units are circular in transverse planes; and the stems 45 and 45a are used where the adjacent surfaces of the overlying units are flat and horizontal.

After the tractor has been lifted by the jack features to the extent required, the stems 45 and 45a are rotated manually to feed them upward until their upper ends engage the bottom face of the overlying unit. The posts 47 and 47a are similarly fed upward by means of a handle applied to their hexes 49 and 49a until the pads 48 and 48a engage the under face of the overlying unit.

When the stems 45 and 45a and the posts 47 and 47a have been adjusted to provide supporting engagement with the under faces of adjacent parts of the overlying units the tractor is stripped of all parts which are normally associated with or connected to the units, thereby to leave only the units upon some one or more of which repair work may be required. Of course in the case of the differential unit D the axle housings may be left attached if desired.

Figures 3, 10, 11, 12, 13:
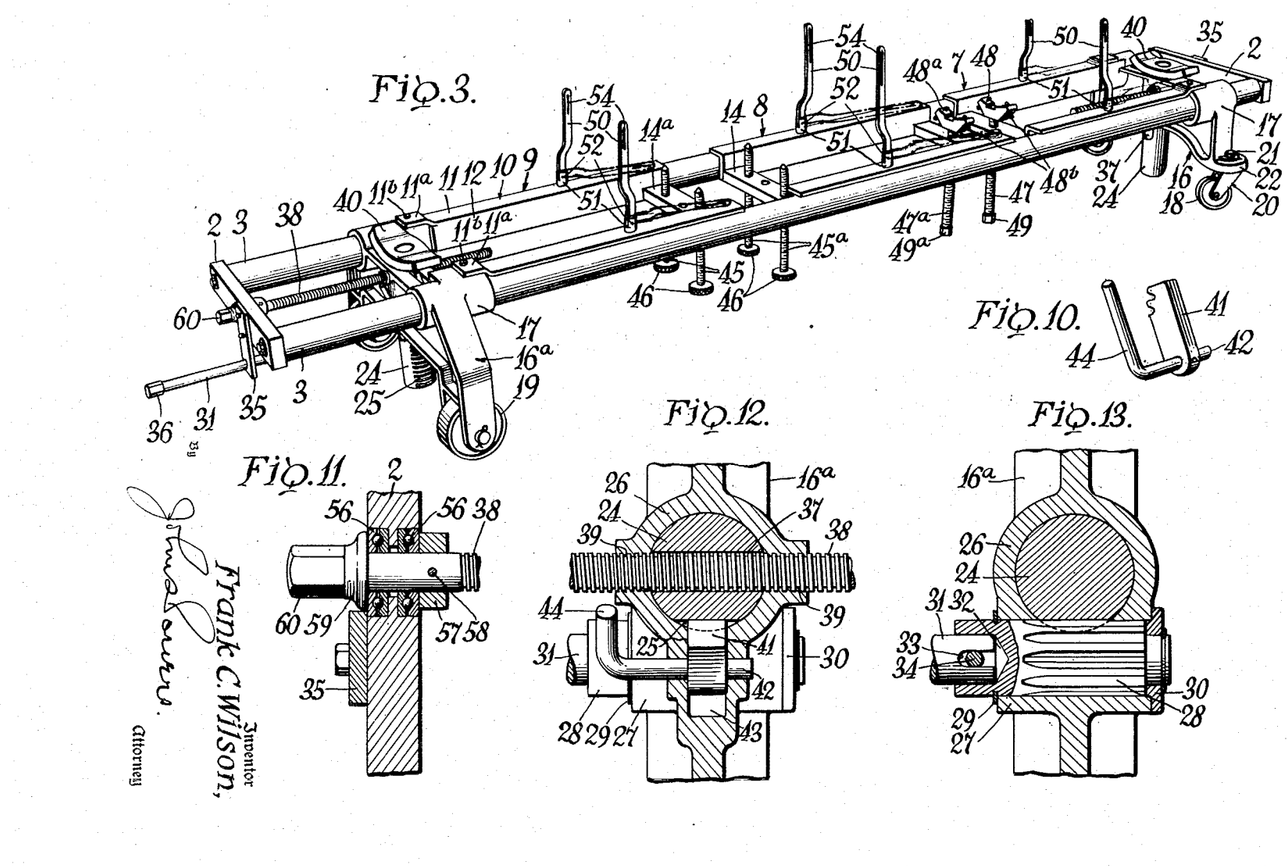
Figure 3 is a perspective view thereof.
Figure 10 is a perspective view of a dog for maintaining the supporting pads of the jack features in any vertical position to which they may be adjusted.
Figure 11 is a vertical section on the line 11—11 of Figure 5.
Figure 12 is a horizontal section on the line 12—12 of Figure 5.
Figure 13 is a horizontal section on the line 13—13 of Figure 5.

The supporting elements 7, 8 and 9 each carry parts which provide lateral support for the units; and when the tractor has been stripped, as above described, the lateral supporting parts are connected to the units. These parts consist of arms 50 which are mounted for movement about vertical and horizontal axes and which, when their use is not required, may rest upon the side bars 10 of the supporting elements 7, 8 and 9, as shown in Figure 3, with respect to the elements 8 and 9, by dot and dash lines. An arm 50 is carried by each of the side bars 10 and is preferably located centrally of the length of the side bar. Thereby each of the supporting elements 7, 8 and 9 is provided with a pair of arms 50 in opposed relation, the arms being connected to the opposite sides of the corresponding unit. The arms 50 are conveniently mounted upon the side bars by means of brackets 51, one for each arm, the brackets being each formed with a pair of ears to accommodate between them the lower terminal portion of a corresponding arm and the arms being pivoted to the brackets by means of horizontal pins 52. The brackets 51 may be connected to the upper flanges 11 of the side bars in any suitable manner. The connection shown consists of a swivel joint which is provided by a vertical shank 53 (Figure 8) projecting downward from the lower end of the bracket 51 and rotatably fitted in an opening of suitable contour in the horizontal flange 11. In their upper portions the arms 50 may be formed with longitudinal slots 54 to accommodate fastening screws 55. The screws 55 may be tapped into recesses or openings already formed in the units for the connection of some part which has been stripped and which is required in the normal use of the tractor. In alining the screws 55 with the threaded recesses in the side walls of the units the arms 50 are turned about their pivots to such extent as may be required to bring their upper portions into adjoining relation to the sides of the unit to which they are to be connected and to effect the registry of the slots 54 with the recess in the sides. Thereupon the screws 55 are shifted along the slots 54 until they are in alinement with the recesses at which time they are engaged in the recesses, thereby to connect the arms 50 to the units in order to provide lateral support therefor. This relation is sufficiently indicated in Figures 2 and 4 and is assumed in Figures 1 and 3.

It will be understood that the units are provided with sundry laterally projecting parts, illustration of which is deemed unnecessary. The purpose of providing both vertical and horizontal axes for the pivotal mounting of the arms 50 is to enable the arms in the course of their movement to the positions in which they are to be connected to the units to be swung outwardly, as may be necessary, in order to clear any laterally projecting parts which the units may carry.

The units M, T and D connected as a rigid integer (with other parts of the tractor stripped), and supported by the dolly in the manner above explained are then moved by the dolly in any desired location at which any one or more of the units as separated from an adjacent unit or units may be removed from the dolly and conveyed to the bench or table where the repair work is to be performed.

The bolted flange connections between adjoining units are sufficiently indicated in Figure 2 by dot and dash lines and are of conventional form. The connections B couple the units M and T and the connections B' couple the units T and D. When the integer has been moved to the location at which one (or more) of the units is to be removed from the dolly and conveyed to the bench or table where the repair work is to be performed the bolts of the appropriate connections B or B' or both, as the case may be, are removed and the separation of the units (one or more) from an adjacent unit is effected. If the unit M is the only one upon which repair work is to be performed the bolts of the connections B are removed, thereby to disconnect the units M and T, whereupon the unit M is moved away from the unit T. If the unit D is the only one upon which work is to be performed the bolts of the connections B' are removed, thereby to disconnect the units D and T, whereupon the unit D is moved away from the unit T. If the unit T is the only one upon which repair work is to be performed the bolts of the connections B and B' are removed, thereby to disconnect all of the units, whereupon the units M and D are moved away from the unit T.

The bolts of the connections B and B', either or both, having been removed, thereby to disconnect a unit from an adjoining unit, the units M and D, either or both, may be moved longitudinally away from the central unit T. For the purpose of effecting such movements of the units M and D the threaded shafts 38 are utilized. The shafts 38 are journalled in the frame end bars 2, preferably by means of ball bearings 56 (Figure 11) of well-known form and arrangement and which require no description in detail. Each shaft 38 is held against endwise movement relatively to the frame end bar 2 in which it is journalled by a collar 57 bearing against the inner face of the end bar and secured upon the shaft by a removable pin 58 and by a fixed collar 59 bearing against the outer face of the end bar. Beyond its collar 59 each shaft 38 is formed with a hexagonal terminal extension 60 to which an operating crank handle (not shown) may be removably applied.

It will be obvious that with the units disconnected the end units M and D, either or both, may be moved by the appropriate rotation of the corresponding shaft 38 away from or toward the central unit T. When the units are to be separated the shafts 38 are, of course, turned sufficiently to effect the proper degree of separation. These operating characteristics are sufficiently disclosed in Figure 4 which assumes the removal of the bolts of the connections B and B' and the operation of the shafts 38 to move the units M and D in the longitudinal direction to an extent away from the central unit T suitable for the removal from the dolly of any or all of the units. It will be noted that in the operation of the shafts 38 the central frame 8 is immovable and the frames 7 and 9, each carrying the corresponding units M and D, are moved relatively to the frame 8, the side bars 10 of the frames 7 and 9 sliding upon the frame side bars 3 and the force which effects the movement of the frames 7 and 9 being applied by the shafts 38 to the cross bars 16 and 16a.

When a unit is disconnected and separated from an adjacent unit or units it may be freely removed from the dolly. Such removal may be effected by manual labor but is more conveniently effected by a hoist which is sufficiently indicated in Figure 4 by the showing of its tackle S and lifting hook H. When a unit is to be removed by a hoist a lifting plate P of a form appropriate to the particular unit may be detachably secured to the upper face of the unit. Figure 4 assumes that the central unit T is to be removed from the dolly and conveyed to the bench or table where the repair work is to be performed. Accordingly Figure 4 shows by dot and dash lines the attachment of a lifting plate P to the upper wall of the central unit T, the lifting plate having an eye P' for cooperation with the hook H. In Figure 4 two positions of the central unit T are shown, viz., a lower position L in which the unit is supported upon the dolly and an upper position U to which it has been raised by the hoist, the position U being well above the positions of the adjacent units M and D as they rest upon the dolly in order that the unit T may be conveyed by the hoist to the bench or table where the repair work is to be performed. The units M and D may each be removed in like manner from the dolly. It will be understood that the lifting plates for each of the units M and D will be of a form appropriate to the particular unit. Since these lifting plates are not parts of the invention their illustration is deemed unnecessary.

When the repair work has been completed the unit or units upon which the work has been done are restored to the dolly in the relation shown in Figure 4 wherein the three units are in longitudinal alinement but are separated from one another. Thereupon either or both of the shafts 38 are operated, according to the circumstances of use, to restore the separated units to the position shown in Figure 2 wherein the units are in abutting relation. The unit connecting bolts (of the connections B—B', either or both according to circumstances) are then reapplied whereby the three units are coupled together as a rigid integer. The dolly is then moved to the appropriate location wherein the tractor is to be reassembled. Prior to such reassembly the arms 50 are disconnected from the tractor and moved to their lower inutile positions. When the reassembly of the tractor has been completed the stems 45 and 45a and posts 47 and 47a are lowered to a sufficient extent and thereupon the bars 24 are raised to the very slight degree which will permit the free disengagement from them of the dogs 41 at which time the bars 24 are lowered, first one and then the other, to bring the wheels of the tractor into floor engaging relation. The lowering of the bars 24 is then continued whereby to move the pads 40 away from the overlying units to an extent which will permit the removal of the dolly from under the tractor.

Figure 14 shows a modified construction of the middle element for the support of the unit T. As in the construction above described the middle element is in fixed relation to the main frame 1 and includes a rectangular frame, here designated 8a, which is auxiliary to the frame 1 and corresponds structurally and functionally to the auxiliary frame 8 of the middle element of the construction above described. However in this modified construction the auxiliary frame side bars 10 of the construction above described are eliminated and their place is taken, structurally and functionally, by portions 10a of the side bars 3 of the frame 1, such portions 10a being the side bars of the auxiliary frame which constitutes the middle element 8a. The auxiliary frame cross bars 14b are the same structurally and functionally as the cross bars 14 of the middle element 8 of the construction above described and are rigidly secured to the main frame side bars 3 in any suitable manner, as by welding, the cross bars 14b rigidly connecting the side bars 3 and delimiting the portions 10a thereof which constitute the side bars of the frame 8a. The stems 45a are carried by one of the cross bars 14b and the post 47a is carried by the other cross bar 14b. The brackets 51 which carry the arms 50 are attached directly to the portions 10a at points midway between the cross bars 14b. For the purpose of such attachment the brackets 51 are provided with depending central stems 61 which project in diametrical relation through openings in the portions 10a and project below the portions 10a. The stems 61 provide the vertical axes of pivotal movement of the arms 50 and hence serve as swivel connections between the brackets 51 and the portions 10a. For this purpose the lower terminal portion of each stem 61 carries a nut (or a collar) 62 which adjoins the corresponding portion 10a and is held against rotation relatively to the stem 61 in any suitable manner, for example, by a cotter pin (Figure 15.)

When the tractor is of the design type which includes but two power plant units, namely, the motor as one unit and the differential gearing and transmission gearing as the other, the middle supporting element 8 of the constructions above described is not required. Only two supporting elements, therefore, need be provided. These are of the same general construction as the supporting elements 7 and 9 of the embodiment above described; they are provided with similar jack features; and they may be individually adjusted lengthwise in either direction on the frame 1 in the same manner and by the same means, the adjustment of either element being from or toward the other accordingly as the units are to be separated or are to be restored to adjoining relation and reconnected.

I claim:

1. A four-wheeled dolly for the support and transport of the longitudinally alined power plant units of tractors which are separably connected in tandem relation in the tractor assembly and as connected constitute a rigid integer, the dolly being movable to a position under the integer as incorporated in the tractor assembly, comprising, in combination: a supporting horizontal main frame of rectangular outline having longitudinally extending parallel side bars and transversely extending end bars rigidly connected to the ends of the side bars; unit supporting elements carried by the main frame, arranged in longitudinal alinement, and individually serving for the support of one of the units of the tractor, the supporting elements being each in the form of a rectangular frame including side bars and cross members and being mounted upon the side bars of the main frame for slidable adjustable movement in either direction lengthwise of the main frame; a jack carried by each of the supporting elements and including a vertical bar movable vertically and axially in either direction and provided at its upper end with a pad for supporting engagement with the overlying unit; a vertical guide sleeve carried by one of the cross members in which the corresponding vertical jack bar is mounted for slidable movement and means associated with each of the supporting elements for raising and lowering the vertical jack bar; means of connection between a cross member of each supporting element and the adjacent end bar of the main frame and operative to effect the adjustable movement of the supporting element in either direction longitudinally of the main frame; and vertically adjustable unit supporting means carried by a cross member of each of the supporting elements for supporting engagement with the overlying unit, such supporting means being additional to the vertical jack bar.

2. A dolly as set forth in claim 1 wherein the means for effecting the adjustable movements of the supporting elements is connected in each instance to the outer cross member of the corresponding supporting element, and said outer cross member is provided with a pair of wheels for the mobile support of the dolly.

3. A dolly as set forth in claim 1 wherein the guide sleeve for the vertical jack bar is provided with threaded openings, the vertical jack bar is provided with a vertical slot, and the means for effecting the adjustable movement of the end supporting elements in each instance consists of a longitudinally extending threaded rotatable shaft journalled in a corresponding end bar of the main frame, having threaded engagement in the openings in the sleeve and extending through the slot in the vertical jack bar.

4. A dolly as set forth in claim 1 wherein the vertical jack bar is provided with rack teeth, the cross member with which the jack bar is associated is provided with a recess in communication with the sleeve in which the jack bar is mounted, and a dog is pivotally mounted in the recess for manual movement into and from engagement with the teeth of the jack bar and as engaged provides a support for the jack bar in any of its raised positions.

5. A dolly as set forth in claim 1 wherein the side bars of the supporting elements are in the form of angle irons mounted in slidable relation upon the side bars of the main frame, the horizontal flanges of the angle irons resting upon the side bars of the main frame and the vertical flanges of the angle irons adjoining the side bars of the main frame.

6. A dolly as set forth in claim 1 wherein the side bars of the end supporting elements are in the form of angle irons mounted in slidable relation upon the side bars of the main frame, the horizontal flanges of the angle irons resting upon the side bars of the main frame and the vertical flanges of the angle irons adjoining the side bars of the main frame, the outer cross members of the supporting elements are provided with longitudinal sleeves slidably fitted upon the side bars of the main frame, and the horizontal flanges of the angle irons are provided with terminal extensions which are connected to the longitudinal sleeves.

7. A dolly as set forth in claim 1 wherein each side bar of each supporting element carries an arm having a raised position and a lowered position and means is provided for the connection of the arm in its raised position to an adjacent side of the corresponding dolly supported unit, the arms in opposed relation as connected to a unit providing lateral support for it and, upon disconnection from the unit, being movable into their lower positions.

8. A dolly as set forth in claim 1 wherein each side bar of each supporting element carries an arm mounted for pivotal movement about vertical and horizontal axes and formed for detachable connection in a raised position to an adjacent side of the corresponding dolly supported unit, the arms in opposed relation as connected to a unit providing lateral support for it and, upon disconnection from the unit, being movable into horizontal positions in which they rest upon the side bars of the supporting element.

9. A dolly as set forth in claim 1 wherein each side bar of each supporting element carries an arm mounted for pivotal movement about vertical and horizontal axes and formed near its outer end with a longitudinal slot serving for the accommodation of a screw which in a raised position of the arm is threaded into the adjacent side of a corresponding supporting unit, the arms in opposed relation as connected to a unit providing lateral support for it and, upon disconnection from the unit, being movable into horizontal positions in which they rest upon the side bars of the supporting element.

10. A four-wheeled dolly for the support and transport of the longitudinally alined, motor, transmission and differential units of tractors which are separably connected in tandem relation in the tractor assembly and as connected constitute a rigid integer, the dolly being movable to a position under the integer as incorporated in the tractor assembly, comprising, in combination: a supporting horizontal main frame of rectangular outline having longitudinally extending parallel side bars and transversely extending end bars rigidly connected to the ends of the side bars; three supporting elements carried by the main frame, arranged in tandem and individually serving for the support of one of the units of the tractor, two of the supporting elements being in end relation in the tandem arrangement and the remaining supporting element being in middle relation in the tandem arrangement, the supporting elements being each in the form of rectangular frames including side bars and cross members, the middle supporting element which carries the transmission unit being rigidly associated with the main frame and the end supporting elements which respectively carry the motor and differential units being longitudinally slidable relatively to the main frame; a jack carried by each of the end supporting elements and including a vertical jack bar movable vertically and axially in either direction and provided at its upper end with a pad for supporting engagement with the overlying unit; a vertical guide sleeve carried by one of the cross members of each end supporting element in which the corresponding vertical jack bar is mounted for slidable movement and means associated with each of the end supporting frames for raising and lowering the vertical jack bar; means of connection between a cross member of each of the end supporting elements and the adjacent end bar of the main frame and operative to effect the adjustable movement of the corresponding end supporting element in a longitudinal direction from and toward the fixed middle supporting element; vertically adjustable unit supporting means carried by a cross member of each of the end supporting elements for supporting engagement with the overlying unit, such supporting means being additional to the vertical jack bar; and vertically adjustable supporting means carried by the cross members of the middle supporting element for supporting engagement with the overlying unit.

FRANK C. WILSON.

REFERENCES CITED

The following references are of record in the file of this patent:

UNITED STATES PATENTS

| Number | Name | Date |
|---|---|---|
| 1,186,876 | Beagle | June 13, 1916 |
| 1,419,160 | McKinnon | June 13, 1922 |
| 1,801,707 | Wing | Apr. 21, 1931 |
| 2,169,446 | Hester | Aug. 15, 1939 |
| 2,355,341 | Trimbach | Aug. 8, 1944 |
| 2,468,884 | L'Esperance et al. | May 3, 1949 |

FOREIGN PATENTS

| Number | Country | Date |
|---|---|---|
| 614,572 | Germany | June 13, 1935 |